US012478538B2

(12) United States Patent
Choi et al.

(10) Patent No.: US 12,478,538 B2

(45) **Date of Patent: *Nov. 25, 2025**

(54) WALKING ASSISTANT DEVICE DEFORMABLE BASED ON THIGH SHAPE

(71) Applicant: Samsung Electronics Co., Ltd., Suwon-si (KR)

(72) Inventors: Byungjune Choi, Suwon-si (KR); Youngbo Shim, Suwon-si (KR); Minhyung Lee, Suwon-si (KR); Younbaek Lee, Suwon-si (KR); Jongwon Lee, Suwon-si (KR); Segon Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,207

(22) Filed: Mar. 31, 2023

(65) Prior Publication Data

US 2023/0233397 A1 Jul. 27, 2023

Related U.S. Application Data

(63) Continuation of application No. 17/730,394, filed on Apr. 27, 2022, now Pat. No. 11,628,118, and a (Continued)

(30) Foreign Application Priority Data

Nov. 1, 2019 (KR) ........................ 10-2019-0138713

(51) Int. Cl.
*A61H 3/00* (2006.01)

(52) U.S. Cl.
CPC ......... *A61H 3/00* (2013.01); *A61H 2201/165* (2013.01); *A61H 2201/1671* (2013.01); *A61H 2205/088* (2013.01); *A61H 2205/108* (2013.01)

(58) Field of Classification Search
CPC ................ A61H 3/00; A61H 2201/165; A61H 2201/1671; A61H 2205/088;

(Continued)

(56) References Cited

U.S. PATENT DOCUMENTS 7,314,458 B2 1/2008 Bodenschatz
9,931,265 B2 4/2018 Shim (Continued)

FOREIGN PATENT DOCUMENTS

CN 105105987 A 12/2015
CN 108095980 A 6/2018

(Continued)

OTHER PUBLICATIONS

Machine translation of written description and claims of CN108938336A via espacenet (Year: 2018).*

(Continued)

*Primary Examiner* — Timothy A Stanis
*Assistant Examiner* — Tyler A Raubenstraw
(74) *Attorney, Agent, or Firm* — NIXON & VANDERHYE P.C.

(57) ABSTRACT

A walking assistance device deformable based on a thigh shape includes a hip joint actuator, an upper thigh frame connected to the hip joint actuator and configured to receive power from the hip joint actuator and rotate about a first axis and rotate about a second axis intersecting the first axis, a motion frame connected to the upper thigh frame, the motion frame including a plurality of segment frames configured to rotate relative to each other, and a lower thigh frame connected to the motion frame.

7 Claims, 8 Drawing Sheets

Related U.S. Application Data continuation of application No. 16/884,601, filed on May 27, 2020, now Pat. No. 11,638,674.

(58) Field of Classification Search
CPC ............ A61H 2205/108; A61H 1/0244; A61H 2201/1628; A61H 2201/164; A61H 2201/1645; A61H 2201/1647; A61H 2201/1602; A61H 2201/16; A61H 2205/102; A61H 2201/167; B25J 9/0006
See application file for complete search history.

(56) References Cited

U.S. PATENT DOCUMENTS 10,064,779 B2 9/2018 Ha
10,070,982 B2 * 9/2018 Kim .......................... A61F 5/01
10,335,341 B2 * 7/2019 Shim .................... G09B 19/003
10,806,603 B2 * 10/2020 Choi ...................... A61B 5/112
2004/0158175 A1 8/2004 Ikeuchi
2006/0064047 A1 * 3/2006 Shimada ............... A61F 5/0102 602/26
2008/0108918 A1 5/2008 Joutras
2010/0036302 A1 2/2010 Shimada
2010/0049102 A1 2/2010 Yasuhara
2010/0069805 A1 3/2010 Kruijsen et al.
2010/0094188 A1 4/2010 Goffer
2010/0298746 A1 * 11/2010 Shimizu ................ B25J 9/0006 601/35
2011/0264015 A1 10/2011 Endo
2013/0012852 A1 1/2013 Imaida
2013/0131560 A1 * 5/2013 Ferguson ................ A61F 5/026 601/33
2013/0204168 A1 8/2013 Bombard
2013/0331744 A1 * 12/2013 Kamon ................ A61H 1/0266 601/35
2014/0018216 A1 1/2014 Hatfield
2014/0330431 A1 * 11/2014 Hollander ................ A61H 3/00 29/428
2014/0358053 A1 12/2014 Triolo
2015/0018739 A1 1/2015 Threlfall
2015/0025423 A1 1/2015 Caires
2015/0142130 A1 * 5/2015 Goldfarb .................. A61H 3/00 623/25
2015/0196403 A1 7/2015 Kim
2015/0272809 A1 10/2015 Accoto
2015/0272811 A1 * 10/2015 Choi ........................ B25J 17/00 74/490.04
2015/0336265 A1 * 11/2015 Choi ........................ A61H 3/00 414/4
2015/0351995 A1 12/2015 Zoss
2015/0366740 A1 12/2015 Endo
2016/0016307 A1 * 1/2016 Choi ........................ A61H 3/00 74/423
2016/0045385 A1 2/2016 Aguirre-Ollinger
2016/0107309 A1 * 4/2016 Walsh ................ A63B 21/0054 248/550
2016/0151227 A1 * 6/2016 Choi ......................... F16B 7/22 623/27
2016/0206498 A1 * 7/2016 Kazerooni ........... A61H 1/0244
2016/0206499 A1 7/2016 Shim
2016/0262969 A1 9/2016 Ohta
2016/0331624 A1 11/2016 Sankai et al.
2017/0014993 A1 * 1/2017 Barnes ................. B25J 19/0016
2017/0020692 A1 1/2017 Lee
2017/0027735 A1 2/2017 Walsh
2017/0035584 A1 * 2/2017 Ha ........................ H01M 10/46
2017/0035640 A1 * 2/2017 Hyung .................. A61F 5/0102
2017/0086990 A1 * 3/2017 Choi .................... A61H 1/0255
2017/0143574 A1 5/2017 Choi
2017/0151083 A1 * 6/2017 Lee ....................... A61F 5/0104
2017/0181917 A1 * 6/2017 Ohta ..................... A61H 1/0281
2017/0252254 A1 9/2017 Velazquez Nino
2017/0319421 A1 11/2017 Julin
2017/0348176 A1 12/2017 Herr
2017/0360645 A1 12/2017 Sodeyama
2017/0367852 A1 12/2017 Kazerooni
2018/0098907 A1 4/2018 Aguirre-Ollinger
2018/0116827 A1 * 5/2018 Lim .......................... A61F 2/70
2018/0116828 A1 5/2018 Quinn
2018/0146890 A1 * 5/2018 Kim ......................... A61H 3/00
2018/0147108 A1 * 5/2018 Lee ...................... A61H 1/0244
2018/0161181 A1 * 6/2018 Roh ....................... B25J 9/0006
2018/0161188 A1 * 6/2018 Zistatsis ................. A61H 1/024
2018/0177670 A1 * 6/2018 Shim ...................... B25J 9/0006
2018/0193172 A1 7/2018 Smith
2018/0200878 A1 7/2018 Tsai
2018/0272525 A1 * 9/2018 Kumeno ................ B25J 9/1638
2018/0280178 A1 10/2018 Shimada
2018/0296422 A1 10/2018 Sawicki
2018/0325764 A1 11/2018 Yagi
2018/0338883 A1 * 11/2018 Chavarria ................ A61H 3/00
2019/0015287 A1 1/2019 Witte
2019/0021932 A1 1/2019 Roh et al.
2019/0070059 A1 3/2019 Dalley
2019/0142680 A1 5/2019 Park
2019/0142682 A1 * 5/2019 Tung .................... A61H 1/0244 601/35
2019/0240524 A1 8/2019 Nasiri
2019/0254915 A1 8/2019 Nam
2019/0262211 A1 8/2019 Son et al.
2019/0274912 A1 9/2019 Nam
2019/0283235 A1 9/2019 Nam
2019/0299421 A1 * 10/2019 Kim ....................... B25J 19/063
2019/0343707 A1 * 11/2019 Riener ................. A61H 1/0244
2019/0358807 A1 * 11/2019 Ohta .................... A61H 1/0244
2019/0380904 A1 12/2019 Panizzolo
2020/0030179 A1 * 1/2020 Schwenn .............. A61F 5/0102

FOREIGN PATENT DOCUMENTS

CN 108273236 A 7/2018
CN 108938336 A * 12/2018 ........... A61F 5/0125
CN 109223454 A * 1/2019 ............... A61H 3/00
CN 109803730 A 5/2019
CN 110103207 A 8/2019
CN 110169890 A 8/2019
EP 2 923 686 A2 9/2015
EP 3132783 A2 * 2/2017 ............... A61F 2/68
JP 2006-75254 A 3/2006
JP 2009240488 A 10/2009
JP 2016-150420 A 8/2016
JP 2018-61663 A 4/2018
KR 10-1431383 B1 8/2014
KR 10-1539552 B1 7/2015
KR 10-2015-0112592 A 10/2015
KR 10-2017-0019175 A 2/2017
KR 10-1736193 B1 5/2017
KR 10-2019-0074693 A 6/2019
WO WO-2018236225 A1 * 12/2018 ............... A61H 3/00
WO WO-2019173184 A1 * 9/2019
WO WO-2020230974 A1 * 11/2020 ........... A61F 5/0125

OTHER PUBLICATIONS

Machine translation of written description and claims of WO2020230974A1 via espacenet (Year: 2019).*
Machine translation of written description and claims of CN109223454B via espacenet (Year: 2018).*
U.S. Appl. No. 16/884,601, filed May 27, 2020; Choi et al.
International Search Report dated Feb. 2, 2021 for International Application No. PCT/KR2020/014850.
Written Opinion mailed Feb. 2, 2021 for International Application No. PCT/KR2020/014850.
U.S. Appl. No. 17/730,394, filed Apr. 27, 2022; Choi et al.
Extended European Search Report dated Oct. 11, 2022 for for EP Application No. 20881413.7.
Extended European Search Report dated Aug. 24, 2023 for EP Application No. 23174003.6.
European Office Action dated May 6, 2024 for EP Application No. 20881413.7.

(56) References Cited

OTHER PUBLICATIONS

Japanese Office Action dated May 28, 2024 for JP Application No. 2022-524687.
Korean Office Action dated May 28, 2024 for KR Application No. 10-2019-0138713.
European Office Action dated Jul. 8, 2024 for EP Application No. 23174003.6.
Chinese Office Action dated Mar. 3, 2025 for CN Application No. 202080076610.3.
Second Office Action for CN Application No. 202080076610.3 issued Jul. 15, 2025 and English translation, 15 pages.

* cited by examiner

WALKING ASSISTANT DEVICE DEFORMABLE BASED ON THIGH SHAPE

CROSS-REFERENCE TO RELATED APPLICATION

This application is a Continuation of U.S. application Ser. No. 16/884,601, filed May 27, 2020, and a Continuation of U.S. application Ser. No. 17/730,394, filed Apr. 27, 2022, each of which claim priority on KR Application No. 10-2019-0138713, filed on Nov. 1, 2019, the entire contents of which are all hereby incorporated herein by reference in their entireties.

BACKGROUND

1. Field

At least one example embodiment relates to a walking assistance device deformable based on a thigh shape.

2. Description of the Related Art

Walking assistance devices enabling the elderly and/or patients having joint problems to walk with less effort, and walking assistance devices increasing muscular strength of users for military purposes are being developed.

SUMMARY

Some example embodiments relate to a walking assistance device deformable based on a thigh shape to closely fit a body shape of a user, and, thus, improve user wearability and decrease the device volume.

Some example embodiments relate to a walking assistance device configured to assist a user.

In some example embodiments, the walking assistance device includes a hip joint actuator; an upper thigh frame connected to the hip joint actuator, the upper thigh frame configured to rotate about a first axis in response to power received from the hip joint actuator, and to rotate about a second axis intersecting the first axis; a motion frame connected to the upper thigh frame, the motion frame including a plurality of segment frames configured to rotate relative to each other based on a shape of a thigh of the user; and a lower thigh frame connected to the motion frame.

In some example embodiments, the plurality of segment frames include an upper segment frame connected to the upper thigh frame; and a lower segment frame connected to the lower thigh frame, the lower segment frame configured to rotate relative to the upper segment frame.

In some example embodiments, the upper segment frame is integrally formed with the upper thigh frame, and the lower segment frame is integrally formed with the lower thigh frame.

In some example embodiments, the upper segment frame is detachably connectable to the upper thigh frame, and the lower segment frame is detachably connectable to the lower thigh frame.

In some example embodiments, the motion frame further includes an elastic body including a first end portion fixed to the upper segment frame and a second end portion fixed to the lower segment frame.

In some example embodiments, the motion frame further includes a rotary shaft configured to connect the upper segment frame and the lower segment frame such that the rotary shaft is parallel to the second axis, wherein the elastic body is configured to enclose the rotary shaft.

In some example embodiments, the motion frame further includes a stopper configured to restrict an angle of rotation of the upper segment frame with respect the lower segment frame.

In some example embodiments, the stopper extends from a first one of the upper segment frame and the lower segment frame toward a second one of the upper segment frame and the lower segment frame.

In some example embodiments, the plurality of segment frames include a first segment frame; a second segment frame rotatably connected a first end of first segment frame; a third segment frame rotatably connected to a second end of the first segment frame; a fourth segment frame rotatably connected to the second segment frame; and a fifth segment frame rotatably connected to the third segment frame and the fourth segment frame, wherein the upper thigh frame is connected to the second segment frame.

In some example embodiments, the motion frame further includes an elastic body including a first end fixed to the fourth segment frame and a second end fixed to the fifth segment frame.

In some example embodiments, the motion frame further includes a first stopper configured to restrict an angle of rotation of the second segment frame with respect to the fourth segment frame; and a second stopper configured to restrict an angle of rotation of the third segment frame with respect to the fifth segment frame.

In some example embodiments, the second segment frame is detachably connectable to the upper thigh frame, and the third segment frame is detachably connectable to the lower thigh frame.

In some example embodiments, the plurality of motion frames are configured to connect to each other in series.

In some example embodiments, the plurality of motion frames include a first motion frame including a first magnet having a first polarity and a first frame body configured to receive the first magnet; and a second motion frame including a second magnet having a second polarity and a second frame body rotatably connected to the first frame body, the second motion frame configured to receive the second magnet, the second magnet configured to face the first magnet.

In some example embodiments, each of the first frame body and the second frame body include rounded end portions facing each other.

Other example embodiments relate to a walking assistance device configured to assist a user.

In some example embodiments, the walking assistance device includes an upper thigh frame; a lower thigh frame; and a motion frame connected between the upper thigh frame and the lower thigh frame, the motion frame including a plurality of segment frames, the plurality of segment frames configured to determine an angle between the upper thigh frame and the lower thigh frame by rotating relative to a neighboring one of the plurality of segment frames to adjust a relative angle with respect to the neighboring one of the plurality of segment frames based on a shape of a thigh of the user.

In some example embodiments, the motion frame is configured to rotate about one or more a third axis that is parallel to the second axis and perpendicular to the first axis.

In some example embodiments, the motion frame is configured to adjust a set distance between the upper frame and the lower frame.

In some example embodiments, the motion frame extends inferiorly from the upper frame when the user is upright.

In some example embodiments, the walking assistance device further includes a wearable portion attached to an inferior end of the lower frame, the wearable portion configured to secure the thigh of the user.

In some example embodiments, the motion frame is configured to rotate about one or more a third axis that is parallel to the second axis and perpendicular to the first axis.

In some example embodiments, the motion frame is configured to adjust a set distance between the upper frame and the lower frame.

In some example embodiments, the motion frame extends inferiorly from the upper frame when the user is upright.

In some example embodiments, the walking assistance device further includes a wearable portion attached to an inferior end of the lower frame, the wearable portion configured to secure the thigh of the user.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
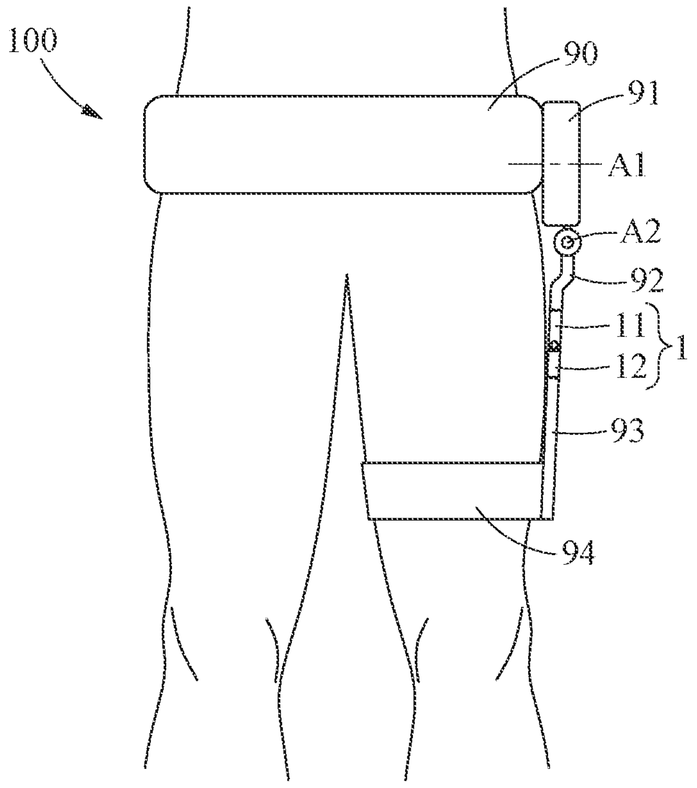
FIG. 1 illustrates a user wearing a walking assistance device according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is “connected”, “coupled”, or “joined” to another component, a third component may be “connected”, “coupled”, and “joined” between the first and second components, although the first component may be directly connected, coupled or joined to the second component.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
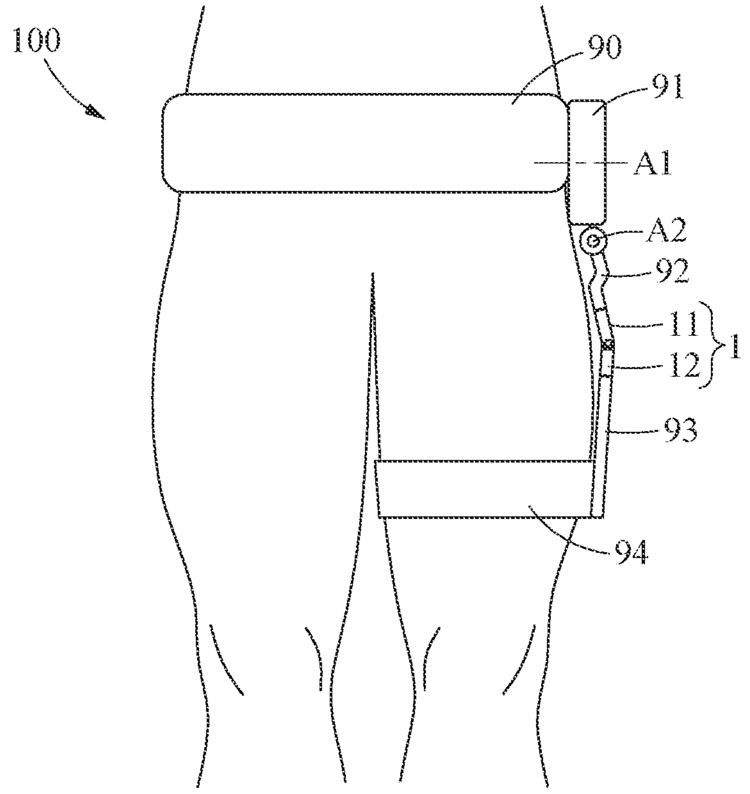
FIG. 2 illustrates a user wearing a walking assistance device according to at least one example embodiment, the user having thicker thighs when compared to the user of FIG. 1.

FIG. 1 illustrates a user wearing a walking assistance device according to at least one example embodiment, and FIG. 2 illustrates a user wearing a walking assistance device according to at least one example embodiment, the user having thicker thighs when compared to the user of FIG. 1.

Referring to FIGS. 1 and 2, in one or more example embodiments, a walking assistance device 100 may be deformable based on a thigh shape of a user. For example, the walking assistance device 100 may closely fit a user having relatively thin thighs and also closely fit a user with relatively thick thighs. When the walking assistance device 100 closely fits a thigh of the user, a separation distance between the walking assistance device 100 and the thigh of the user may decrease. The user may wear clothes over the walking assistance device 100, and the wearability that the user feels may improve.

The walking assistance device 100 may assist a hip joint of the user. The walking assistance device 100 may include a waist wearable portion 90, a hip joint actuator 91, an upper thigh frame 92, a motion frame 1, a lower thigh frame 93, and a thigh wearable portion 94. The motion frame 1 may be deformed based on a thigh shape of the user. The upper thigh frame 92 may adjust an angle with respect to the hip joint actuator 91. Through the angle adjustment of the upper thigh frame 92 and the deformation degree of the motion frame 1, the walking assistance device 100 may closely fit the thigh of the user.

The waist wearable portion 90 may support a waist of the user. The waist wearable portion 90 may have a length adjustable based on a waist circumference of the user. The waist wearable portion 90 may support the hip joint actuator 91. The waist wearable portion 90 may be positioned such that the hip joint actuator 91 may be disposed alongside the hip joint.

The hip joint actuator 91 may generate power to assist the hip joint of the user. The hip joint actuator 91 may support the upper thigh frame 92. The hip joint actuator 91 may rotate the upper thigh frame 92 about a first axis a1. The hip joint actuator 91 may assist an extension and a flexion of the thigh.

The upper thigh frame 92 may be connected to the hip joint actuator 91, and receive the power from the hip joint actuator 91 and rotate about the first axis a1 and rotate about a second axis a2 intersecting the first axis a1. The upper thigh frame 92 may rotate about the hip joint actuator 91 in response to an adduction or an abduction of the thigh. The upper thigh frame 92 may rotate about the hip joint actuator 91 based on the thigh shape of the user, in addition to the adduction or the abduction of the thigh. For example, when a user having relatively thick thighs wears the walking assistance device 100, the upper thigh frame 92 may rotate outward about the hip joint actuator 91.

The motion frame 1 may include an extra degree of freedom (DOF), so as to be deformed based on the thigh shape of the user. The motion frame 1 may be deformed and determine an angle between the upper thigh frame 92 and the lower thigh frame 93. The motion frame 1 may be positioned between the upper thigh frame 92 and the lower thigh frame 93. The motion frame 1 may include a plurality of segment frames 11 and 12 configured to rotate relative to each other. The plurality of segment frames 11 and 12 may include the upper segment frame 11 and the lower segment frame 12 connected to perform a 1-DOF rotation.

For example, an angle between the upper segment frame 11 and the lower segment frame 12 when a user having relatively thick thighs wears the walking assistance device 100 may be less than an angle between the upper segment frame 11 and the lower segment frame 12 when a user having relatively thin thighs wears the walking assistance device 100.

The motion frame 1 may be deformed based on an angle of the upper thigh frame 92 about the hip joint actuator 91. For example, when a user having relatively thick thighs wears the walking assistance device 100, the walking assistance device 100 may closely fit the thigh of the user in a manner that the upper thigh frame 92 is pushed outward by the thigh and the lower segment frame 12 is bent in a direction toward the thigh with respect to the upper segment frame 11.

The motion frame 1 may be provided as an integral body with the upper thigh frame 92 and the lower thigh frame 93, or may be detachably connected to the upper thigh frame 92 and the lower thigh frame 93. When the motion frame 1 is detachably connected to the upper thigh frame 92 and the lower thigh frame 93, the user may mount the motion frame 1 between the upper thigh frame 92 and the lower thigh frame 93, or remove the motion frame 1 from the walking assistance device 100, as necessary. For example, if the motion frame 1 is removed from the walking assistance device 100, the lower thigh frame 93 may be mounted directly on the upper thigh frame 92.

The motion frame 1 may include a fixing member (not shown) configured to fix the angle between the upper thigh frame 92 and the lower thigh frame 93.

The lower thigh frame 93 may be connected to the motion frame 1. The lower thigh frame 93 may be provided as an integral body with the motion frame 1, or detachably connected to the motion frame 1.

The thigh wearable portion 94 may support the thigh of the user. The thigh wearable portion 94 may have a length adjustable based on a thigh circumference of the user.

Referring to FIG. 1, a user having relatively thin thighs may wear the walking assistance device 100. In this example, the angle between the upper segment frame 11 and the lower segment frame 12 of the motion frame 1 may be relatively great. In detail, the upper segment frame 11 and the lower segment frame 12 may form an approximately straight line such that the angle between the upper segment frame 11 and the lower segment frame 12 may be approximately 180 degrees.

Referring to FIG. 2, a user having relatively thick thighs may wear the walking assistance device 100. In this example, the upper thigh frame 92 may stay in a state of being pushed outward about the second axis a2 by the thigh, that is, in a counterclockwise direction. In addition, the lower segment frame 12 may stay in a state of being rotated inward about the upper segment frame 11, that is, in a clockwise direction, and the lower thigh frame 93 may closely fit the thigh of the user.

Figure 3:
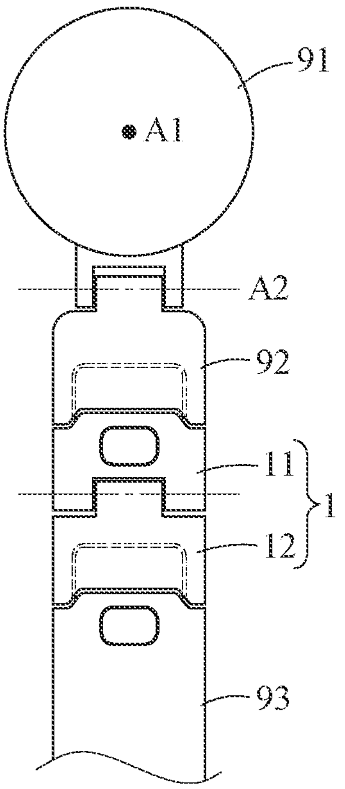
FIG. 3 is a front view illustrating a walking assistance device according to at least one example embodiment.
Figure 4:
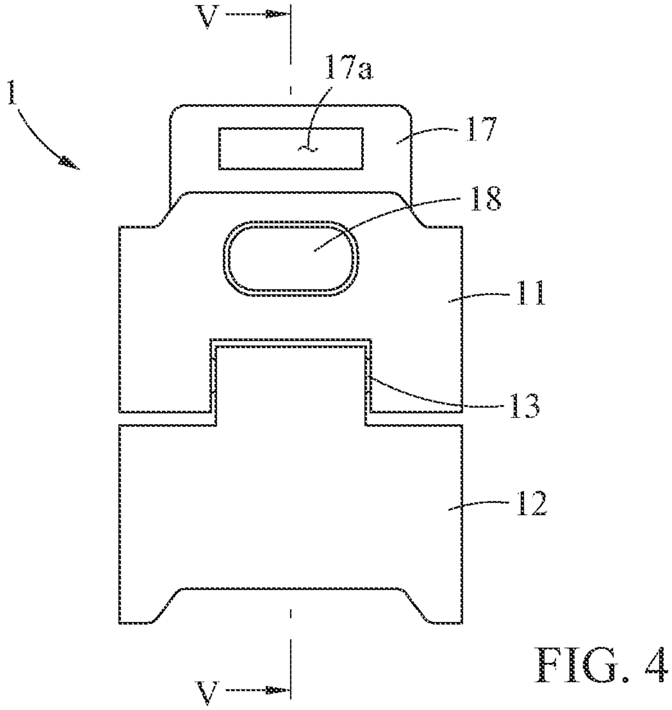
FIG. 4 is a front view illustrating a motion frame according to at least one example embodiment.
Figure 5:
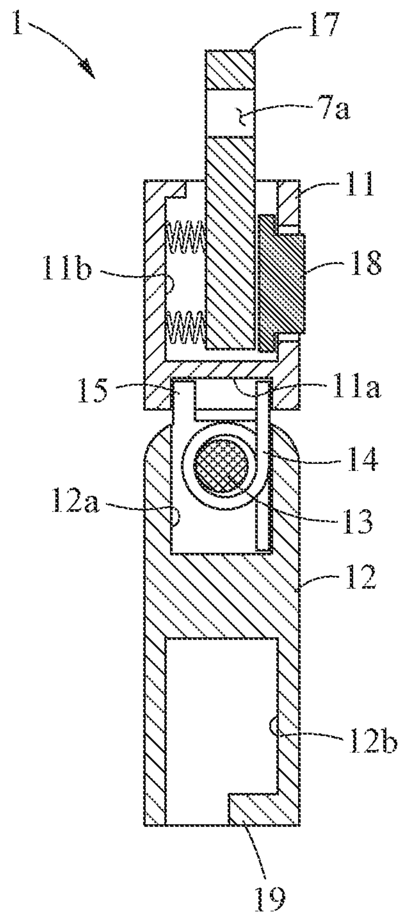
FIG. 5 is a cross-sectional view cut along a line V-V of FIG. 4.
Figure 6:
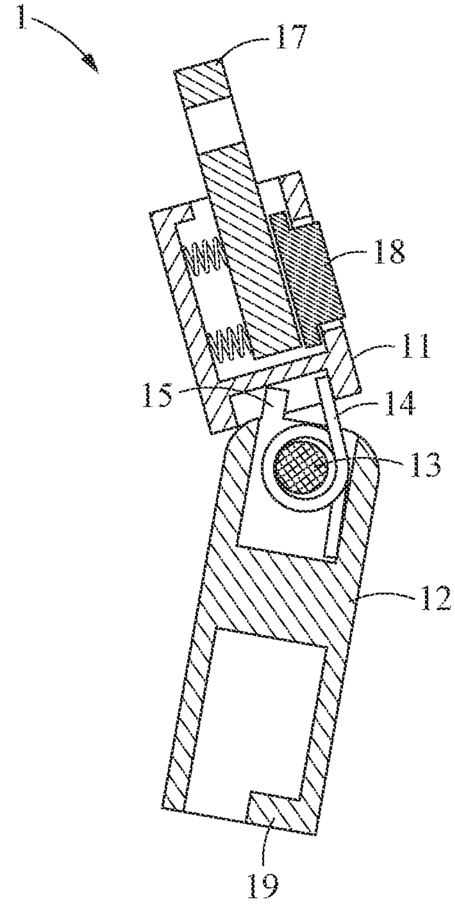
FIG. 6 is a cross-sectional view illustrating a deformation of the motion frame of FIG. 5.

FIG. 3 is a front view illustrating a walking assistance device according to at least one example embodiment, FIG. 4 is a front view illustrating a motion frame according to at least one example embodiment, FIG. 5 is a cross-sectional view cut along a line V-V of FIG. 4, and FIG. 6 is a cross-sectional view illustrating a deformation of the motion frame of FIG. 5.

Referring to FIGS. 3 through 6, the motion frame 1 may include the upper segment frame 11, the lower segment frame 12, a rotary shaft 13, an elastic body 14, a stopper 15, an upper connecting member 17, a button 18, and a lower connecting member 19.

The upper segment frame 11 may be connected to the upper thigh frame 92 provided on an upper side. The upper segment frame 11 may be rotatably connected to the lower segment frame 12 by the rotary shaft 13. The upper segment frame 11 may include a first upper hollow 11*a* and a second upper hollow 11*b*.

The lower segment frame 12 may be connected to the lower thigh frame 93 provided on a lower side. The lower segment frame 12 may be rotatably connected to the upper segment frame 11 by the rotary shaft 13.

The rotary shaft 13 may rotatably connect the upper segment frame 11 and the lower segment frame 12. For example, the rotary shaft 13 may be a rod that penetrates through one of the upper segment frame 11 and the lower segment frame 12 and is inserted into the other one. For example, the rotary shaft 13 may be a rod that is provided as an integral body with one of the upper segment frame 11 and the lower segment frame 12 and protrudes toward the other one. The rotary shaft 13 may be provided to be parallel to the second axis a2 which is a rotation axis of the upper thigh frame 92.

The rotary shaft 13 may be disposed at 90 degrees with respect to the first axis a1 which is a drive axis of the hip joint actuator 91. Here, being disposed at 90 degrees may indicate that a virtual auxiliary line parallel to the first axis a1 which is the drive axis of the hip joint actuator 91 is perpendicular to the rotary shaft 13. In this structure, it is possible to prevent the deformation of the motion frame 1 by the hip joint actuator 91 and to reduce a loss of power while the power of the hip joint actuator 91 is transmitted to the lower thigh frame 93.

The walking assistance device may implement a motion about the first axis a1 by the hip joint actuator 91, a rotational motion of the upper thigh frame 92 connected to the hip joint actuator 91 so as to rotate about the second axis a2, and a rotational motion of the lower segment frame 12 connected to the hip joint actuator 91 so as to rotate about the upper segment frame 11.

The elastic body 14 may assist the motion frame 1 to maintain the basic shape of a straight line. One end portion of the elastic body 14 may be fixed to the upper segment frame 11, and the other end portion thereof may be fixed to the lower segment frame 12. For example, the one end portion of the elastic body 14 may be received in the first upper hollow 11*a* of the upper segment frame 11 and fixed to an inner wall of the upper segment frame 11, and the other end portion of the elastic body 14 may be received in a first lower hallow 12*a* of the lower segment frame 12 and fixed to an inner wall of the lower segment frame 12. The elastic body 14 may be a spring. While the lower segment frame 12 is rotating relative to the upper segment frame 11 about the rotary shaft 13 in a clockwise direction, elastic energy stored in the elastic body 14 may gradually increase.

A central portion of the elastic body 14 may enclose the rotary shaft 13. Even when an end portion of the elastic body 14 is separated from the upper segment frame 11 and/or the lower segment frame 12, the elastic body 14 may be stably hung over the rotary shaft 13.

The stopper 15 may restrict rotation angles of the upper segment frame 11 and the lower segment frame 12. In the example of FIG. 6, the stopper 15 may prevent the lower segment frame 12 rotating relative to the upper segment frame 11 in a counterclockwise direction. The stopper 15 may assist the lower segment frame 12 to rotate only in an inward direction.

The stopper 15 may extend from one of the upper segment frame 11 and the lower segment frame 12 toward the other one. In FIGS. 5 and 6, an example in which the stopper 15 extends from the lower segment frame 12 and is received in the first upper hollow 11*a* of the upper segment frame 11 is illustrated. However, examples are not limited thereto.

In some other example embodiments, in addition to the elastic body 14 associated with the rotary shaft 13 of the motion frame 1, the rotational shaft of the second axis a2 may have an elastic body associated therewith to urge the upper thigh frame 92 in a clockwise direction towards the thigh of the user as the upper thigh frame 92 is being pushed outward about the second axis a2 by the thigh, that is, in the counterclockwise direction.

As described above, the motion frame 1 may be provided as an integral body with the upper thigh frame 92 and the lower thigh frame 93 or detachable from the upper thigh frame 92 and the lower thigh frame 93. Hereinafter, a detachable structure will be described in detail, based on an example in which the motion frame 1 is detachable from the upper thigh frame 92 and the lower thigh frame 93.

The upper connecting member 17 may connect the upper segment frame 11 to the upper thigh frame 92. A portion of the upper connecting member 17 may be received in the upper segment frame 11, and the other portion of the upper connecting member 17 may be inserted into the upper thigh frame 92. The upper connecting member 17 may include a connecting hole 7*a*. The upper connecting member 17 may be received in the second upper hollow 11*b* and supported by an elastic body.

The button 18 may be connected to one side of the upper connecting member 17, such that at least a portion thereof may protrude toward an outer side of the upper segment frame 11. The user may push the button 18 to push the upper connecting member 17.

The upper thigh frame 92 may include a projection (not shown) to be inserted into the connecting hole 7*a* of the upper connecting member 17. While pushing the upper connecting member 17 by pushing the button 18, the user may insert the upper connecting member 17 into the upper thigh frame 92 and then release the button 18. In this example, the upper connecting member 17 may return to its original place, and the projection provided in the upper thigh frame 92 may be inserted into the connecting hole 7*a* of the upper connecting member 17.

The lower connecting member 19 may include a projection (not shown) that functions similar to the projection of the upper thigh frame 92, and the lower thigh frame 93 may include elements corresponding to the upper connecting member 17 and the button 18.

However, the structure for detaching the motion frame 1 from the upper thigh frame 92 and/or the lower thigh frame 93 is not limited thereto.

Figure 7:
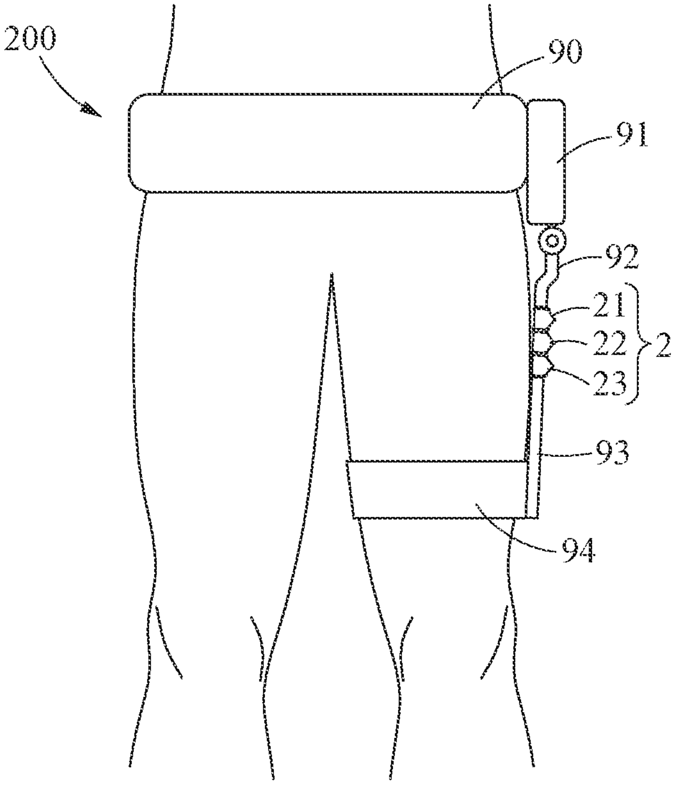
FIG. 7 illustrates a user wearing a walking assistance device according to at least one example embodiment.
Figure 8:
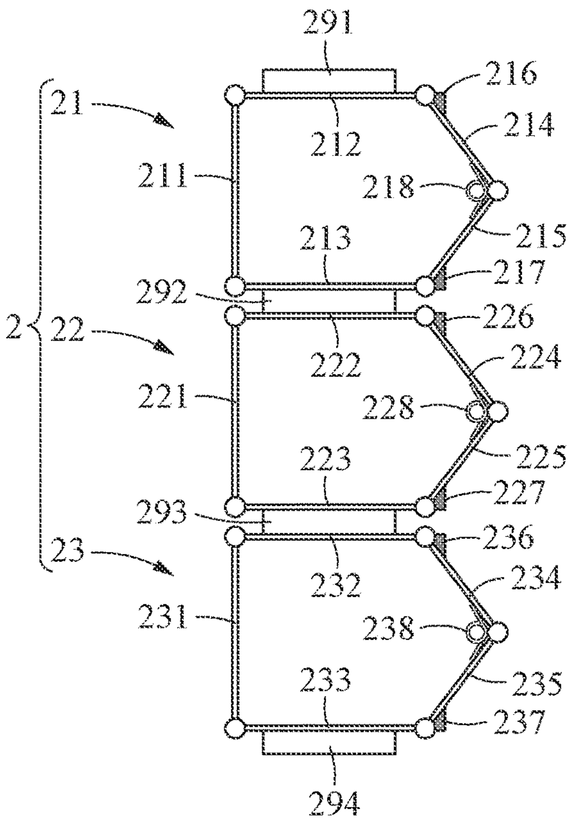
FIG. 8 is a side view illustrating a motion frame according to at least one example embodiment.
Figure 9:
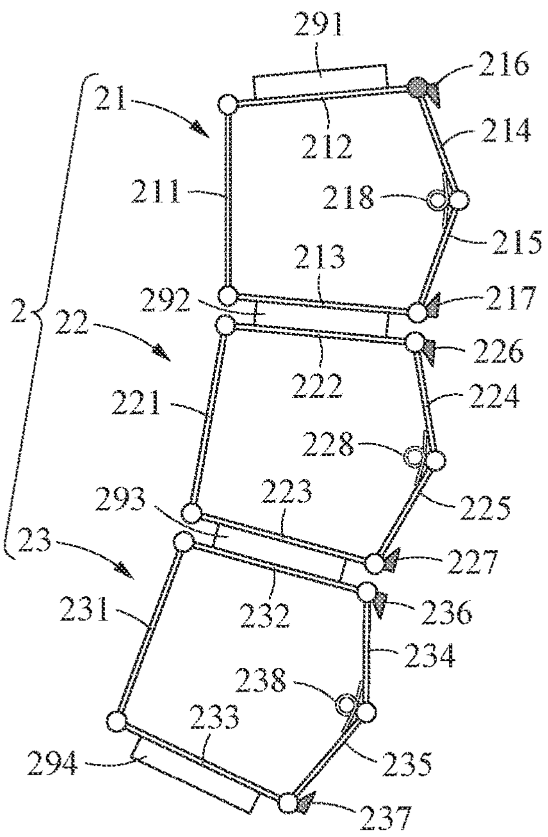
FIG. 9 is a cross-sectional view illustrating a deformation of the motion frame of FIG. 8.

FIG. 7 illustrates a user wearing a walking assistance device according to at least one example embodiment, FIG. 8 is a side view illustrating a motion frame according to at least one example embodiment, and FIG. 9 is a cross-sectional view illustrating a deformation of the motion frame of FIG. 8.

Referring to FIGS. 7 through 9, a walking assistance device 200 may be deformable based on a thigh shape of a user. For example, the walking assistance device 200 may closely fit a user having relatively thin thighs and also closely fit a user with relatively thick thighs.

The walking assistance device 200 may include the waist wearable portion 90, the hip joint actuator 91, the upper thigh frame 92, a motion frame 2, the lower thigh frame 93, and the thigh wearable portion 94.

A plurality of motion frames 2 may be provided. For example, the plurality of motion frames 2 may include a first motion frame 21, a second motion frame 22, and a third motion frame 23 that are connected to each other in series. The plurality of motion frames 2 may each include a plurality of segment frames. The plurality of motion frames 2 may be connected so as to rotate relative to each other. The rotation of the plurality of motion frames 2 may allow the walking assistance device 200 to closely fit a thigh of a user, irrespective of the thigh shape of the user. Hereinafter, the plurality of segment frames will be described based on the first motion frame 21. However, the plurality of segment frames of the first motion frame 21 may apply to the second motion frame 22 and/or the third motion frame 23.

The first motion frame 21 may include first through fifth segment frames 211, 212, 213, 214, and 215 that are connected in the form of a pentagon.

The first through fifth segment frames 211, 212, 213, 214, and 215 may each be hinged to a neighboring segment frame. The first segment frame 211 may be aligned with the upper thigh frame 92 and/or the lower thigh frame 93. The second segment frame 212 may be rotatably connected to an upper end of the first segment frame 211, and the third segment frame 213 may be rotatably connected to a lower end of the first segment frame 211. The fourth segment frame 214 may be rotatably connected to the second segment frame 212, and the fifth segment frame 215 may be rotatably connected to the third segment frame 213 and the fourth segment frame 214.

The first motion frame 21 may further include an elastic body 218 with one end fixed to the fourth segment frame 214 and the other end fixed to the fifth segment frame 215. The elastic body 218 may be provided on inner sides of the fourth segment frame 214 and the fifth segment frame 215. If an angle between the fourth segment frame 214 and the fifth segment frame 215 increases, elastic energy stored in the elastic body 218 may increase.

The first motion frame 21 may further include a first stopper 216 configured to restrict rotation angles of the second segment frame 212 and the fourth segment frame 214, and a second stopper 217 configured to restrict rotation angles of the third segment frame 213 and the fifth segment frame 215. The first stopper 216 may be fixed to an end portion of the second segment frame 212 and contact an outer side of the fourth segment frame 214. The second stopper 217 may be fixed to an end portion of the third segment frame 213 and contact an outer side of the fifth segment frame 215.

The second segment frame 212 may be provided as an integral body with the upper thigh frame 92 or detachably connected to the upper thigh frame 92. The third segment frame 213 may be provided as an integral body with the lower thigh frame 93 or detachably connected to the lower thigh frame 93. For example, the first connecting member 291 may be inserted into the upper thigh frame 92. The first connecting member 291 may be provided in the upper thigh frame 92, and the second connecting member 292 may be provided in the lower thigh frame 93.

The first motion frame 21 may be disposed between the upper thigh frame 92 and the lower thigh frame 93, wherein motion frames other than the first motion frame 21 may be connected alongside in series. For example, the second motion frame 22 and the third motion frame 23 may be connected alongside under the first motion frame 21. In this example, the second connecting member 292 provided on the bottom of the first motion frame 21 may be connected to the second motion frame 22. The second motion frame 22 or the third motion frame 23 may include a third connecting member 293. A fourth connecting member 294 may be provided on the bottom of the third motion frame 23 and detachably connected to the lower thigh frame 93.

The second motion frame 22 may include first through fifth segment frames 221, 222, 223, 224, and 225 that are connected in the form of a pentagon, and first and second stoppers 226 and 227, and an elastic body 228. The third motion frame 23 may include first through fifth segment frames 231, 232, 233, 234, and 235 that are connected in the form of a pentagon, first and second stoppers 236 and 237, and an elastic body 238.

For example, the first connecting member 291 may be provided in the second segment frame 212 of the first motion frame 21 and detachably connected to the upper thigh frame 92. In detail, the second connecting member 292 detachably connecting the first motion frame 21 and the second motion frame 22 may be provided in the third segment frame 213 of the first motion frame 21 and/or the second segment frame 222 of the second motion frame 22. The third connecting member 293 detachably connecting the second motion frame 22 and the third motion frame 23 may be provided in the third segment frame 223 of the second motion frame 22 and/or the second segment frame 232 of the third motion frame 23. The fourth connecting member 294 may be provided in the third segment frame 233 of the third motion frame 23 and detachably connected to the lower thigh frame 93. The number of motion frames 21, 22, and 23 may be determined based on a selection of the user. For example, for a user having relatively long thighs, it is possible to increase the number of motion frames.

In some other example embodiments, the motion frame may be a sliding assembly that includes a support frame and a sliding frame configured to move relative thereto within an accommodating space therein to compensate for a length corresponding to a difference in height of users.

Figure 10:
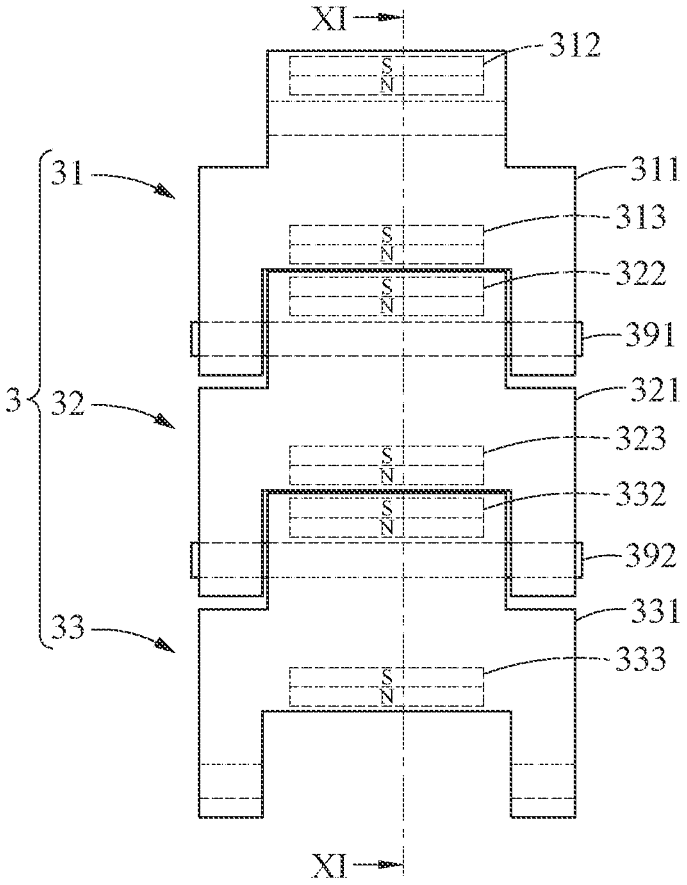
FIG. 10 is a front view illustrating a motion frame according to at least one example embodiment.
Figure 11:
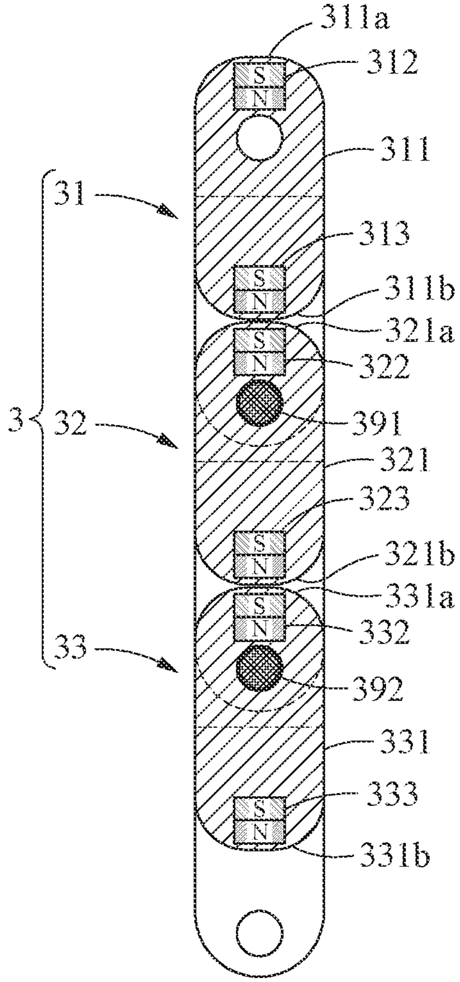
FIG. 11 is a cross-sectional view cut along a line XI-XI of FIG. 10.
Figure 12:
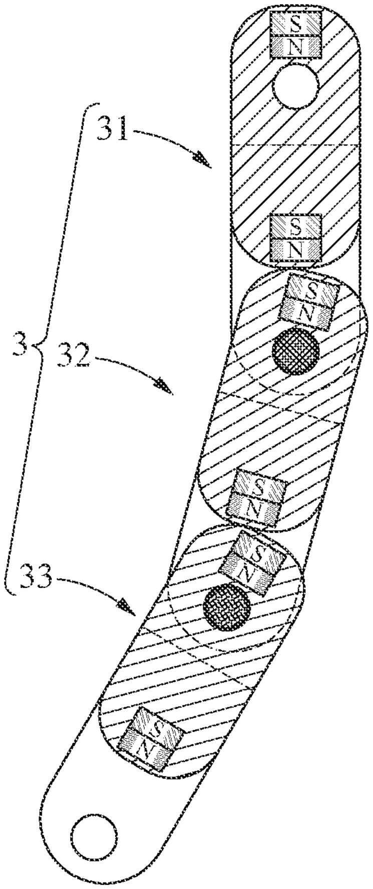
FIG. 12 is a cross-sectional view illustrating a deformation of the motion frame of FIG. 11.

FIG. 10 is a front view illustrating a motion frame according to at least one example embodiment, FIG. 11 is a cross-sectional view cut along a line XI-XI of FIG. 10, and FIG. 12 is a cross-sectional view illustrating a deformation of the motion frame of FIG. 11.

Referring to FIGS. 10 through 12, a plurality of motion frames 3 may be provided. For example, the motion frames 3 may include a first motion frame 31, a second motion frame 32, and a third motion frame 33 that are connected to each other in series.

The first motion frame 31 may include a first frame body 311, and one or more first magnets 312 and 313.

The first frame body 311 may be rotatably connected to the upper thigh frame 92 (See FIG. 7) and the second motion frame 32. The first frame body 311 may include a first upper round part 311*a* formed at an end portion facing the upper thigh frame 92 (See FIG. 7), and a first lower round part 311*b* formed at an end portion facing the second motion frame 32. The first round parts 311*a* and 311*b* may reduce a minimum distance between a magnet provided in the first motion frame 31 and a magnet provided in the upper thigh frame 92 (See FIG. 7) and/or the second motion frame 32.

The one or more first magnets 312 and 313 may be received in the first frame body 311. Here, two first magnets 312 and 313, in detail, the first upper magnet 312 and the first lower magnet 313, may be provided. However, examples are not limited thereto. For example, a single first magnet or three or more magnets may be provided in the first frame body 311.

For example, the first upper magnet 312 may face a magnet (not shown) provided in the upper thigh frame 92 with an opposite polarity. An attraction force between the magnet (not shown) provided in the upper thigh frame 92 and the first upper magnet 312 may assist the first motion frame 31 to maintain the shape of a straight line with respect to the upper thigh frame 92. Further, even when an angle between the upper thigh frame 92 and the first motion frame 31 changes based on a body shape of the user, the attraction force may assist the first motion frame 31 to closely fit a body of the user.

The second motion frame 32 may include a second frame body 321, and the one or more second magnets 322 and 323. The second frame body 321 may be rotatably connected to the first motion frame 31 and the third motion frame 33, where the second frame body 321 may rotate about rotary shaft 391. The second frame body 321 may include a second upper round part 321*a* formed at an end portion facing the first motion frame 31, and a second lower round part 321*b* formed at an end portion facing the third motion frame 33. The second round parts 321*a* and 321*b* may reduce a minimum distance between a magnet provided in the second motion frame 32 and a magnet provided in the first motion frame 31 and/or the second motion frame 32.

The one or more second magnets 322 and 323 may be received in the second frame body 321. The second upper magnet 322 may face the first lower magnet 313 received in the first motion frame 31 with an opposite polarity. The second lower magnet 323 may face a third upper magnet 332 received in the third motion frame 33 with an opposite polarity. The third motion frame 33 will be described further below,.

An attraction force between the first lower magnet 313 and the second upper magnet 322 and/or an attraction force between the second lower magnet 323 and the third upper magnet 332 may assist the motion frames 3 to maintain the shape of a straight line. Even when angles of the motion frames 3 change based on the body shape of the user, the one or more second magnets 322 and 323 may assist the motion frames 3 to closely fit the body of the user.

The third motion frame 33 may include a third frame body 331, and the one or more third magnets 332 and 333.

The third frame body 331 may be rotatably connected to the second motion frame 32 and the lower thigh frame 93 (See FIG. 7), where the third frame body 331 may rotate about rotary shaft 392. The third frame body 331 may include a third upper round part 331*a* and a third lower round part 331*b*.

The one or more third magnets 332 and 333 may be received in the third frame body 331. For example, the third upper magnet 332 may face the second lower magnet 323 with an opposite polarity. A magnet (not shown) provided in the lower thigh frame 93 and the third lower magnet 333 may face with opposite polarities. Even when the angles of the motion frames 3 changes based on the body shape of the user, the one or more third magnets 332 and 333 may assist the motion frames 3 to closely fit the body of the user.

In some example embodiments, the magnets 312, 313, 322, 323, 332, 333 may be electromagnetics configured to selectively create a magnetic field in response to an electric current provided thereto. For example, the walking assistance device may include a controller (not shown) configured to determine whether a condition is present and selectively create the magnetic field and/or vary a strength of the magnetic field based on the condition. For example, as a walking speed of the user increases, the controller may increase the magnetic field to increase the rigidity of the motion frames 3.

The controller (not shown) may include processing circuitry including, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may be special purpose processing circuitry that adjusts the magnetic field to control the rigidity of the motion frames 3. Further, in some example embodiments, the processing circuitry may further control the hip joint actuator 91 to provide an assistance torque to the user.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wearable device configured to be worn by a user, comprising:

an upper thigh frame;

a lower thigh frame;

a motion frame connected between at least the upper thigh frame and the lower thigh frame, the motion frame including a plurality of segment frames, each of the segment frames being pivotal relative to at least one other segment frame, the plurality of segment frames including a upper segment frame and a lower segment frame;

a rotary shaft connecting the upper segment frame and the lower segment frame;

an elastic body enclosing the rotary shaft; and a stopper configured to restrict an angle of rotation of the upper segment frame with respect to the lower segment frame, wherein the motion frame is configured to allow an angle between the upper thigh frame and the lower thigh frame to be adjusted using the rotary shaft, wherein the motion frame is configured, using the rotary shaft, to pivot relative to each of the upper thigh frame and the lower thigh frame, wherein one end portion of the elastic body is configured to be fixed to the upper segment frame, and the other end portion the elastic body is configured to be fixed to the lower segment frame, wherein the stopper extends from the lower segment frame toward the upper segment frame, and wherein the upper segment frame includes a first upper hollow for simultaneously accommodating the stopper and the one end portion of the elastic body.

2. The wearable device of claim 1, wherein the motion frame is configured to adjust a set distance between the upper thigh frame and the lower thigh frame.

3. The wearable device of claim 1, further comprising:

a hip joint actuator rotatably connected to the upper thigh frame;

a waist wearable portion coupled to the hip joint actuator and having a length adjustable based on a waist circumference of the user; and a thigh wearable portion having a length adjustable based on a thigh circumference of the user, wherein the lower thigh frame is connected to the thigh wearable portion.

4. The wearable device of claim 3, wherein the hip joint actuator is supported by and positioned against the waist wearable portion.

5. The wearable device of claim 1, wherein said motion frame comprises first, second, and third segment frames, the second segment frame being located between and connected to the first and third segment frames, and wherein the second segment frame is configured to pivot about a first axis relative to the first segment frame, and to pivot about a second axis relative to the third segment frame.

6. A wearable device configured to be worn by a user, comprising:

a waist wearable portion configured to be wearable on a waist of a user;

a thigh wearable portion configured to be wearable on a thigh of the user;

a hip joint actuator supported by the waist wearable portion and configured to generate torque;

an upper thigh frame coupled to the hip joint actuator and configured to rotate about a first axis based on the torque from the hip joint actuator;

a lower thigh frame coupled to the thigh wearable portion;

a rotary shaft;

an elastic body enclosing the rotary shaft;

the upper thigh frame and the lower thigh frame are configured so as to allow an angle between the upper thigh frame and the lower thigh frame to be adjusted via rotation about the rotary shaft, wherein a motion frame is provided between the lower thigh frame and the upper thigh frame, the motion frame comprising a plurality of segment frames, each of the segment frames being pivotal relative to at least one other segment frame, the plurality of segment frames including a upper segment frame and a lower segment frame, and wherein the motion frame is configured to allow an angle between the upper thigh frame and the lower thigh frame to be adjusted using the rotary shaft, wherein the rotary shaft connects the upper segment frame and the lower segment frame, and wherein one end portion of the elastic body is configured to be fixed to the upper segment frame, and the other end portion the elastic body is configured to be fixed to the lower segment frame, and a stopper configured to restrict an angle of rotation of the upper segment frame with respect to the lower segment frame, wherein the stopper extends from the lower segment frame toward the upper segment frame, and wherein the upper segment frame includes a first upper hollow for simultaneously accommodating the stopper and the one end portion of the elastic body.

7. The wearable device of claim 6, wherein the hip joint actuator is supported by and positioned against the waist wearable portion.

* * * * *